United States Patent [19]
Kokudo

[11] Patent Number: 5,978,361
[45] Date of Patent: Nov. 2, 1999

[54] ATM DIGITAL RADIO TRANSMISSION METHOD AND SYSTEM THEREFOR

[75] Inventor: Junichi Kokudo, Tokyo, Japan

[73] Assignee: NEC Corporation, Tokyo, Japan

[21] Appl. No.: 08/812,783

[22] Filed: Mar. 6, 1997

[30] Foreign Application Priority Data

Mar. 7, 1996 [JP] Japan .................................. 8-049788

[51] Int. Cl.⁶ .............................. H04J 3/00; H04B 7/212
[52] U.S. Cl. ......................... 370/280; 370/337; 370/395
[58] Field of Search .................................. 370/280, 294, 370/345, 347, 348, 349, 395, 337, 394, 528, 505

[56] References Cited

U.S. PATENT DOCUMENTS

| | | | |
|---|---|---|---|
| 5,461,607 | 10/1995 | Miyagi et al. ........................... | 370/244 |
| 5,481,544 | 1/1996 | Baldwin .................................. | 370/392 |
| 5,570,361 | 10/1996 | Norizuki et al. ........................ | 370/395 |
| 5,648,969 | 7/1997 | Pasternak et al. ....................... | 370/349 |
| 5,684,791 | 11/1997 | Raychaudhuri et al. ................ | 370/278 |
| 5,717,689 | 2/1998 | Ayanoglu ................................ | 370/349 |
| 5,787,080 | 7/1998 | Hulyalkar et al. ...................... | 370/349 |
| 5,799,003 | 8/1998 | Fujimaki et al. ....................... | 370/244 |

*Primary Examiner*—Chau Nguyen
*Assistant Examiner*—Soon-Dong Hyun
*Attorney, Agent, or Firm*—Young & Thompson

[57] ABSTRACT

An ATM digital radio transmission system bi-directionally transmits the ATM cell data from an ATM switch or ATM terminal between the radio base station and a plurality of radio subscriber stations over a radio circuit in a TDMA/TDD system. The TDMA/TDD system consists of a plurality of burst signals, each of which has a different configuration from an ordinary ATM cell only in its header section unique to the radio transmission. Idle cells are inserted to the radio transmission speed. The receiver side detects error bits in the header and payload sections to prevent occurrence of cell loss or the like.

8 Claims, 8 Drawing Sheets

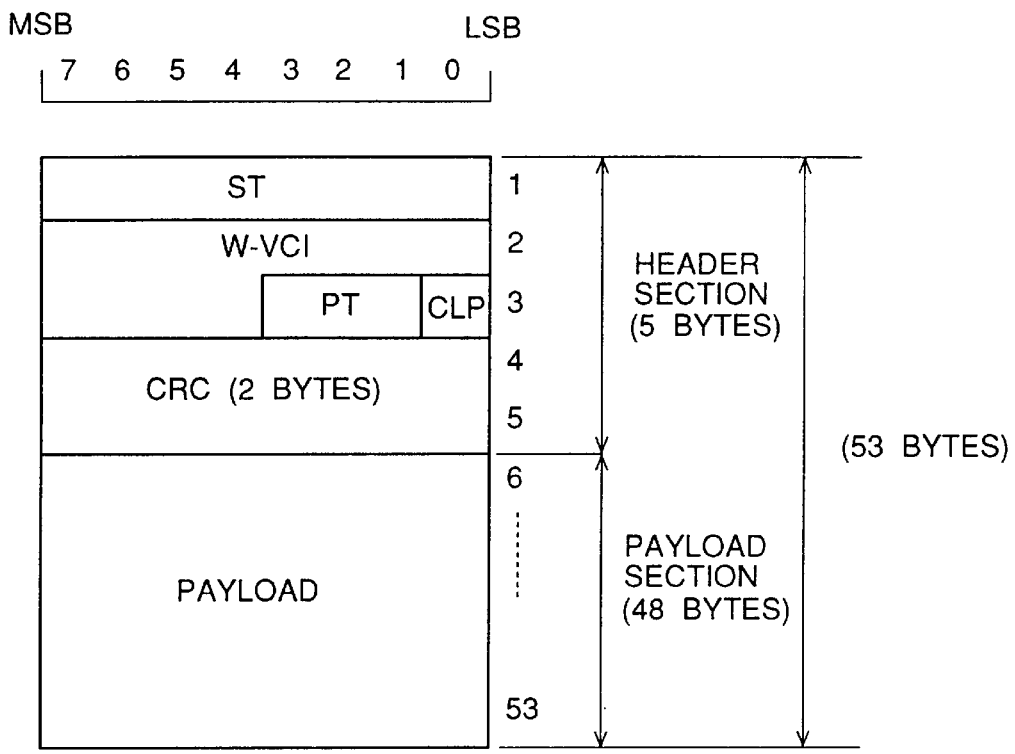
Fig.5
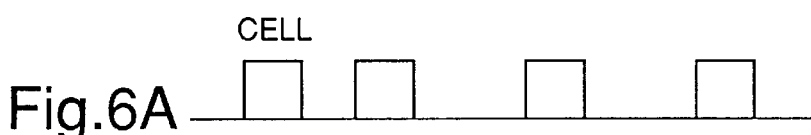
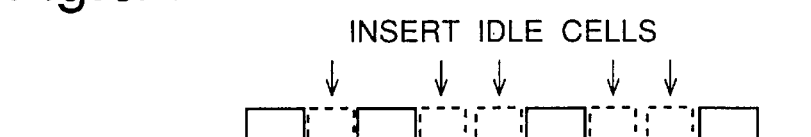
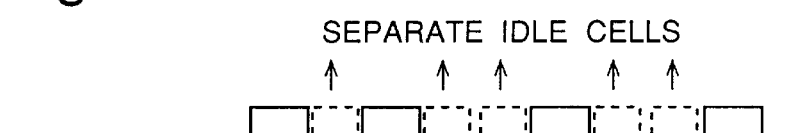
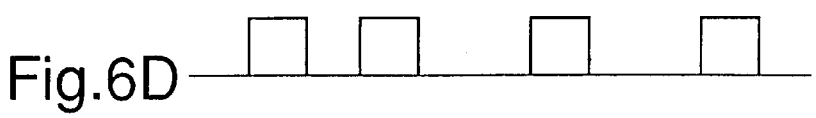

ATM DIGITAL RADIO TRANSMISSION METHOD AND SYSTEM THEREFOR

BACKGROUND OF THE INVENTION

1. Field of the Invention

The present invention relates to an ATM digital radio transmission method for transferring cells in an asynchronous transfer mode (ATM), and an apparatus therefor, and, more particularly, to an ATM digital radio transmission method with a variable capacity feature for detecting and separating idle cells and a system for it.

2. Related Background Art

As there arise needs for multimedia communication including motion images, it is contemplated to provide services of such broadband communication over a wide area by using an ATM switch and a radio transmission system in a high frequency band such as a microwave band or higher.

The ATM system converts all information into fixed information called cells, and transmits the cells at a high speed without depending on their contents which are continuous information such as voice, an motion images or burst information such as data, and without depending on transmission speeds for each of them. That is, the ATM system assigns a physical circuit to a plurality of calls by establishing multiplexed logical links on a physical circuit. Then, motion image data or voice data from a terminal corresponding to each call is decomposed into fixed length information units (called cells), and sequentially sent out to the circuit to attain multiplexing.

FIG. 1 shows an example of conventional network configuration in an ATM digital radio transmission system for transmitting data at a high speed between a plurality of ATM terminals and a base station.

The figure shows an ATM switch 1, a radio base station 2, a plurality of radio subscriber stations 30-1–30-N, and a plurality of ATM terminals 4-1–4-N such as personal computers. The ATM switch 1 is connected to the radio base station 2 through high speed transmission lines 101 and 101' such as fiber optics.

Here, as shown in FIG. 2, each of the ATM cells transmitted over the ATM transmission lines 101 and 101' consists of a 53-byte fixed length block, 5 bytes of which constitute a header section, and 48 bytes of which constitute an information region (payload).

The header section is used for multiplexing or routing the ATM cells. It serves an important function because, in transferring information, the network only interprets the header section and ignores the payload section. The header section contains a virtual channel identification (VCI) for identifying a call, a virtual path identifier (VPI) for identifying the path, a GFC used for controlling a flow between cylinders, a header error control (HEC) which is a code for correcting errors in the payload section and the header section, so that, even if the data is decomposed into blocks, its destination can be identified. The HEC uses error correction with one-byte cyclic redundancy check (CRC).

Then, the radio base station 2 is connected to a plurality of radio subscriber stations 30-1–30-N via high frequency radio circuits 201-1–201-N, and 201'-1–201'-N in, the aloha system which is a well-known random access system for packet data.

That is, an ATM cell data input into the radio base station 2 is transmitted to a predetermined radio subscriber stations 30-1–30-N in the aloha system by determining a destination in the header section. If it collides in radio sections 201-1–201-N, and 201'-1–201'-N, the cell is retransmitted.

On the contrary, transmission is similarly performed in the aloha system from the radio subscriber stations 30-1–30-N to the radio base station 2.

However, since the above conventional system is the ATM digital radio transmission system using the aloha system for the radio circuit, it has effective throughput in the radio circuit as low as 20%, so that, when the number of subscriber stations increases, there arise problems such as cell loss where cells cannot be transmitted, or cell delay where it takes much time for transmitted cells to reach the destination.

In addition, the cell loss and the cell delay cannot be applied to high speed data transmission at 25 Mbps or higher, and is limited to data transmission as low as 2–10 Mbps.

Deterioration of quality or limitation in data transmission speed because of such cell loss or cell delay cause deterioration of quality for the entire ATM network, leading to significant trouble in implementing B-ISDN (Broadband-Integrated Services Digital Network) in the future.

SUMMARY OF THE INVENTION

The present invention is invented in view of the above, and intended to provide an ATM digital radio transmission system and a system for it which eliminate the problems of cell loss and cell delay in the conventional system, and can perform high speed digital data transmission.

To attain the above object, the present invention is an ATM digital radio communication method in which an ATM cell data input and output in and from an ATM switch or an ATM terminal is bi-directionally transmitted between one radio base station and a plurality of radio subscriber stations over a high frequency radio circuit, the ATM digital radio communication method comprising the steps of performing the bi-directional transmission over the high frequency radio circuit in a TDMA/TDD system; converting the ATM cell into a radio ATM cell containing a control bit and an error control bit in its header; and inserting the radio ATM cell into a burst signal for the TDMA/TDD system.

In addition, the ATM radio communication method further comprises the steps of:

inserting and sending an idle cell in a TDMA frame format into a part of the ATM cell data array at the transmitter side of the radio base station or the plurality of radio subscriber stations, a predetermined fixed pattern being inserted into a header section and an information bit section of the idle cell;

receiving a signal inserted with the idle cell at the receiver side of the radio base station or the plurality of radio subscriber stations;

comparing bits of the received idle cell with the fixed pattern previously stored; and separating the idle cell when a count value of errors is a predetermined number or less.

Furthermore, the present invention is an ATM digital radio communication system in which an ATM cell data input and output in and from an ATM switch or an ATM terminal is bi-directionally transmitted between one radio base station and a plurality of radio subscriber stations over a high frequency radio circuit, the ATM digital radio communication system performing the bi-directional transmission over the high frequency radio circuit in a TDMA/TDD system;

each of the radio base station and the plurality of subscriber stations comprising:

an ATM transmission interface circuit for converting the ATM cell into a radio ATM cell containing a control bit and an error control bit in its header;

a radio transmission circuit for transmitting the radio ATM cell as a TDMA burst signal;

a radio receiving circuit for receiving the output of the radio transmission circuit and modulating the radio ATM cell; and an ATM receiving interface circuit for converting the radio ATM cell into the ATM cell.

In addition, in the ATM digital radio communication system, each of the radio base station and the plurality of subscriber stations comprising:

an idle insertion circuit for inserting and sending an idle cell in a TDMA frame format into a part of the ATM cell data at the transmitter side of the radio base station or the plurality of radio subscriber stations, a predetermined fixed pattern being inserted into a header section and an information bit section of the idle cell;

an idle cell detector circuit for receiving a signal inserted with the idle cell at the receiver side of the radio base station or the plurality of radio subscriber stations, and comparing bits of the received idle cell with a fixed pattern previously stored to determine whether or not a count value of errors is a predetermined number or less; and an idle cell separator circuit for separating the idle cell when the count value of errors is said predetermined number or less.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 5 is a radio ATM cell in a radio section of FIG. 3;

FIGS. 6A–6D are the concept of insertion and separation of an idle cell;

DETAILED DESCRIPTION OF THE PREFERRED EMBODIMENTS

Now, an embodiment of the present invention is described with reference to the drawings.

Figure 3:
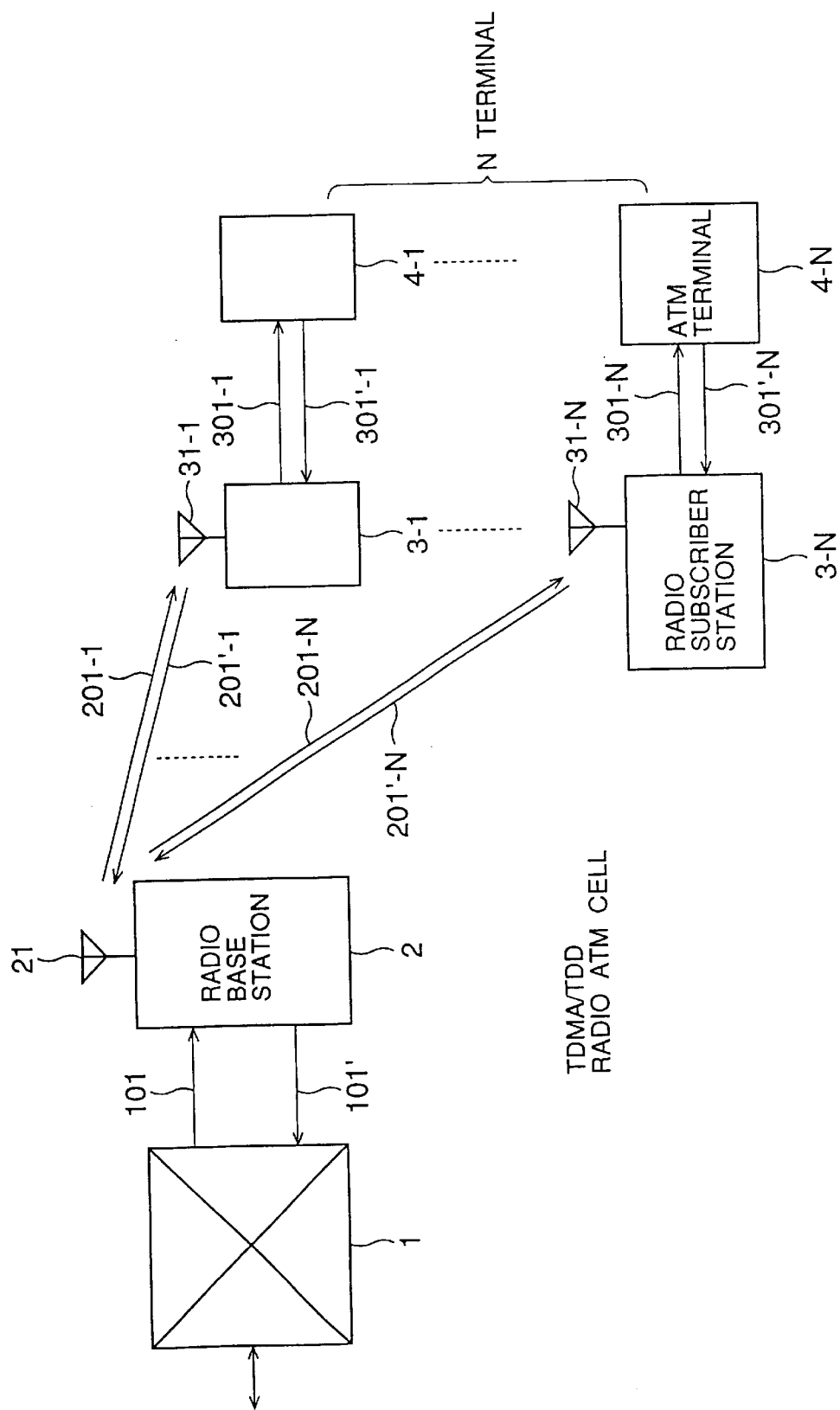
FIG. 3 is a network configuration of ATM digital radio transmission system according to the present invention.

FIG. 3 shows a system configuration of the ATM digital radio transmission system according to the present invention. In the figure, an ATM switch 1 is connected to a radio base station 2 which is in turn multiplex connected to a plurality of radio subscriber stations 3-1–3-N and a plurality of ATM terminals 4-1–4-N through a TDMA radio circuit to constitute a radio transmission network in the ATM system.

Here, there are shown an ATM switch 1, a radio base station 2, a plurality of radio subscriber stations 3-1–3N, and a plurality of ATM terminals 4-1–4-N such as personal computers. The ATM switch 1 is connected to the radio base station 2 via high speed ATM transmission lines 101 and 101' such as fiber optics.

On the other hand, the radio base station 2 is connected to the plurality of radio subscriber stations 3-1–3-N in a bi-directional time division multiple access/time division duplex system (TDMA/TDD system) over high frequency radio circuits 201-1–201-N and 201'-1–201'-N.

In addition, the plurality of radio subscriber stations 3-1–3-N are connected to the ATM terminals 4-1–4-N through high speed transmission lines 301-1–301-N and 301'-1–301'-N, respectively.

Figure 4:
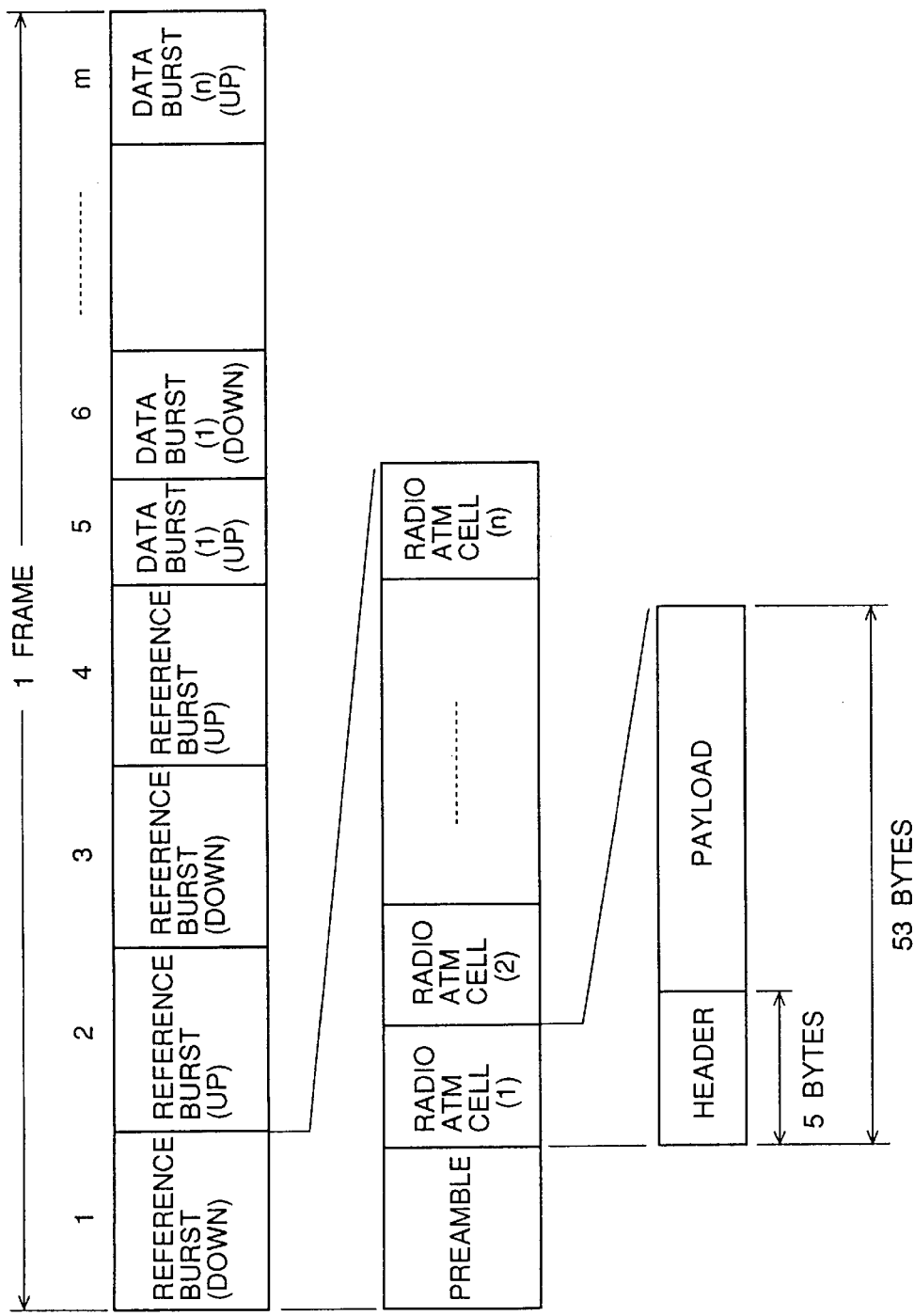
FIG. 4 is a frame format of a TDMA burst in a radio section of FIG. 3.

First, FIG. 4 shows the frame format of a TDMA radio circuit transmitted over the radio transmission circuits 201-1–201-N and 201'-1–201'-N.

The TDMA system is a system for effectively using the radio circuits by time dividing the up radio circuits 201-1–201-N (radio circuits from the radio subscriber stations 3-1–3-N to the radio base station 2) and the down radio circuits 201'-1–201'-N (radio circuits from the radio base station 2 to the radio subscriber stations 3-1–3-N) for transmission.

That is, transmission is performed by alternately dividing signals in a single frequency between the base station and a plurality of subscriber stations with a predetermined cycle.

FIG. 4 shows one frame of a TDMA burst signal which frame is divided into a plurality (m) of time slots. These time slots are assigned with predetermined burst signals.

That is, the first is a reference burst which constitutes a reference signal for TDMA frame to match a burst signal from each subscriber station to predetermined timing. This reference burst consists of burst signals time divided into the up and down circuits.

In addition, the second is control burst for the up and down circuits. They are data signals used for multiplex connection control because the network has an arrangement for multiplex connection between the radio base station 2 and a plurality of subscriber stations 3.

Furthermore, data signals on a plurality of transmission information are arranged for each subscribe station as the third burst signal on the up and down circuits.

While burst signals are alternatively placed on the up and down circuits, the present invention is not limited to such arrangement, but various arrangements may be contemplated such that the up circuit is placed on the first half of the frame, and the down circuit is placed on the second half of the frame.

Then, in the figure, detail of each burst signal is described by using the enlarged view of reference signal on the down circuit. Other burst signals have the same arrangement as this signal.

That is, this reference burst comprises a preamble signal used for carrier synchronization, clock synchronization, unique word synchronization or the like, followed by radio ATM cells provided exclusively for a plurality of radio sections provided for a plurality of subscriber stations.

The radio ATM cell has the same basic structure as the above-described ATM cell which comprises a 53-byte header section and a payload section. However, for the radio section of the basic structure, the header section is arranged to have a special structure because more errors occur when compared with a cable section, or for control of the radio station.

FIG. 5 shows detail of the radio ATM cell. In the figure, ST is a one-byte radio control bit which is used for control unique to the radio circuit, and represents, for example, the type of radio circuit service and information on effective radio ATM cells. In addition, W-VCI is bits corresponding to VPI and VCI shown in FIG. 3. The bits of W-VCI are limited to two bytes in total including PT and CLP by limiting the number of virtual paths and virtual channels. On the other hand, since HEC shown in FIG. 3 is one byte, and has insufficient error correction capability for an error due to fading in the radio section or the like, the present invention uses a CRC code of two bytes.

While the present invention arranges the radio control bit to be one byte, it is not limited to it, but may append more bits depending on the network configuration.

The present invention is described for the fact that the radio ATM as a whole is arranged to have the same length as the ATM cell (53 bytes) by appending ST and CRC bits needed for the radio section. However, the radio ATM cell length is not limited to the same cell length. For a circuit with low receiving electric field such as satellite communication, it becomes longer than the ATM cell as an FEC control bit is further appended to the CRC code. However, this causes no problem because an independent format can be used as a radio section.

The TDMA frame format described above is for a case where all ATM cells are generated for a unit of time. However, actually, when the transmission capacity varies for an ATM cell data, the number of cells to be transmitted varies for a unit of time.

In this case, the TDMA radio transmission system employs a method where the transmitter side inserts dummy cells (idle cells) to always make the frame length constant, and transmits the frame to the radio transmission speed, while the receiver side detects and separates the inserted idle cells by detecting the type of cells appended to the header section of the idle cells.

The present invention is intended to easily detect the interference wave and to simplify the control of TDMA timing by making the TDMA format constant for the variation of transmission capacity.

FIG. 6 shows the concept for illustrating the function for inserting and separating the idle cells.

In the figure, FIG. 6A shows transmission data consisting of an ATM cell data array. In the figure, the cells are not arranged with a constant interval because the transmission data capacity varies from the ATM switch or ATM terminal. FIG. 6B shows to form a TDMA transmission signal by inserting idle cells in empty positions where no cell exists. FIG. 6C shows to detect and separate the idle cells from received data which is the received transmission data of FIG. 6B. FIG. 6D shows that the idle cells are separated, and received data matching the transmission data can be obtained.

Figure 7:
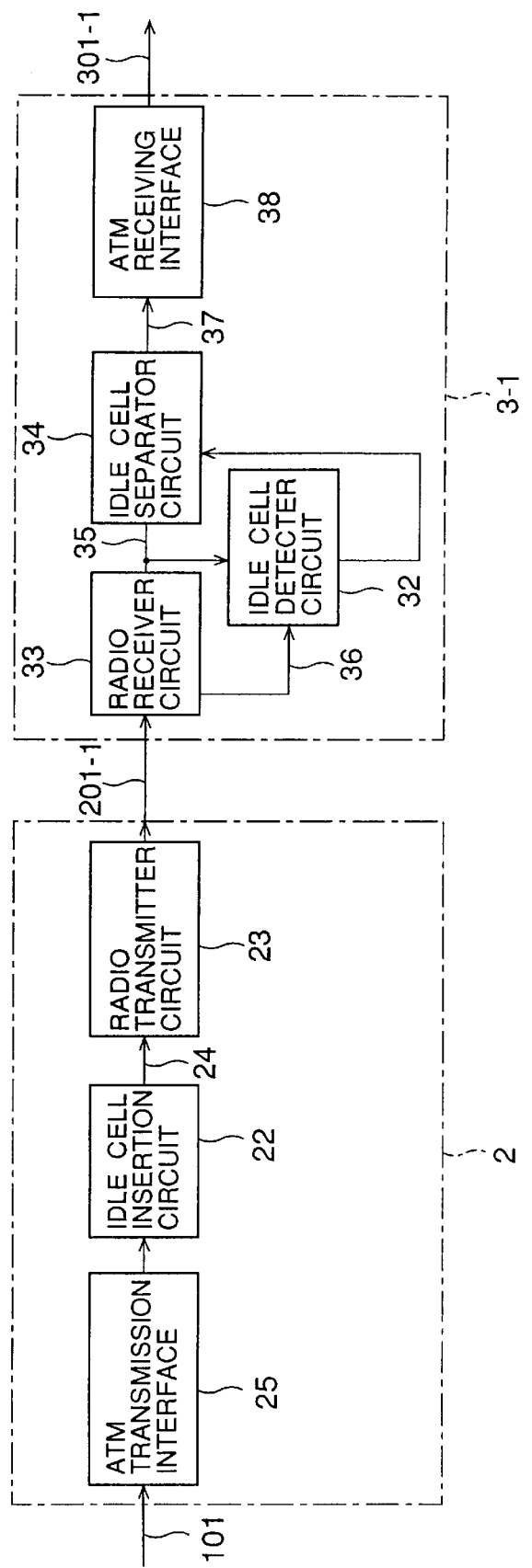
FIG. 7 is a block diagram showing the configuration of the radio base station and the radio subscriber station 3-1 of FIG. 3.

FIG. 7 shows a specific block diagram on insertion, separation and detection of the idle cells.

While the figure shows, as an example, a configuration of transmission from the radio base station 2 to the radio subscriber station 3-1, the configuration is the same as this in transmission to other radio subscriber stations 3-2 –3-N. Contrary, transmission from the radio subscriber stations 3-1–3-N to the radio base station takes the same configuration, for which the description is omitted.

In addition, in the configuration of the radio base station 2, configuration of a control unit for a plurality of subscriber stations is irrelevant to the present invention, so that description is omitted.

In the figure, when an ATM transmission signal 101 is received at the base station 2, it is first input into an ATM transmission interface circuit 25. The ATM transmission interface circuit 25 has a function for converting an optical signal into an electric signal, and converting an ATM cell into a radio ATM cell. Then, the output of the ATM transmission interface circuit 25 is input into an idle cell insertion circuit 22. The idle cell insertion circuit 22 has a function for inserting data predetermined to match radio transmission speed as idle cells into a header section and an information bit section of a radio ATM cell data array to be transmitted.

The output of the idle cell insertion circuit 22 is input into a radio transmitter circuit 23 including a digital modulator and a high frequency transmitter in a microwave band, digital modulated, and transmitted to a subscriber station 3-1 by a radio circuit 201 through a base station antenna 21.

The subscriber station 3-1 receives the transmission signal 201-1, demodulates it with a radio receiver circuit 33 including a high frequency receiver circuit and a digital demodulator, and outputs demodulated data. The demodulated data is input into an idle cell separator circuit 34, and an idle cell detector circuit 32. The idle cell detector circuit 32 has predetermined idle cell pattern information for the header and information bit sections, and compares it with the received cell array to detect the idle cells. The output of the idle cell detector circuit 32 is input into the idle cell separator circuit 34 which in turn separates and deletes the idle cells. The output 37 of the idle cell separator circuit 34 is input into an ATM receiving interface 38 which has functions for converting the electric signal into an optical signal, and converting the radio ATM cell into an ATM cell.

Now, the specific configuration of FIG. 7 is described in the following.

Figure 8:
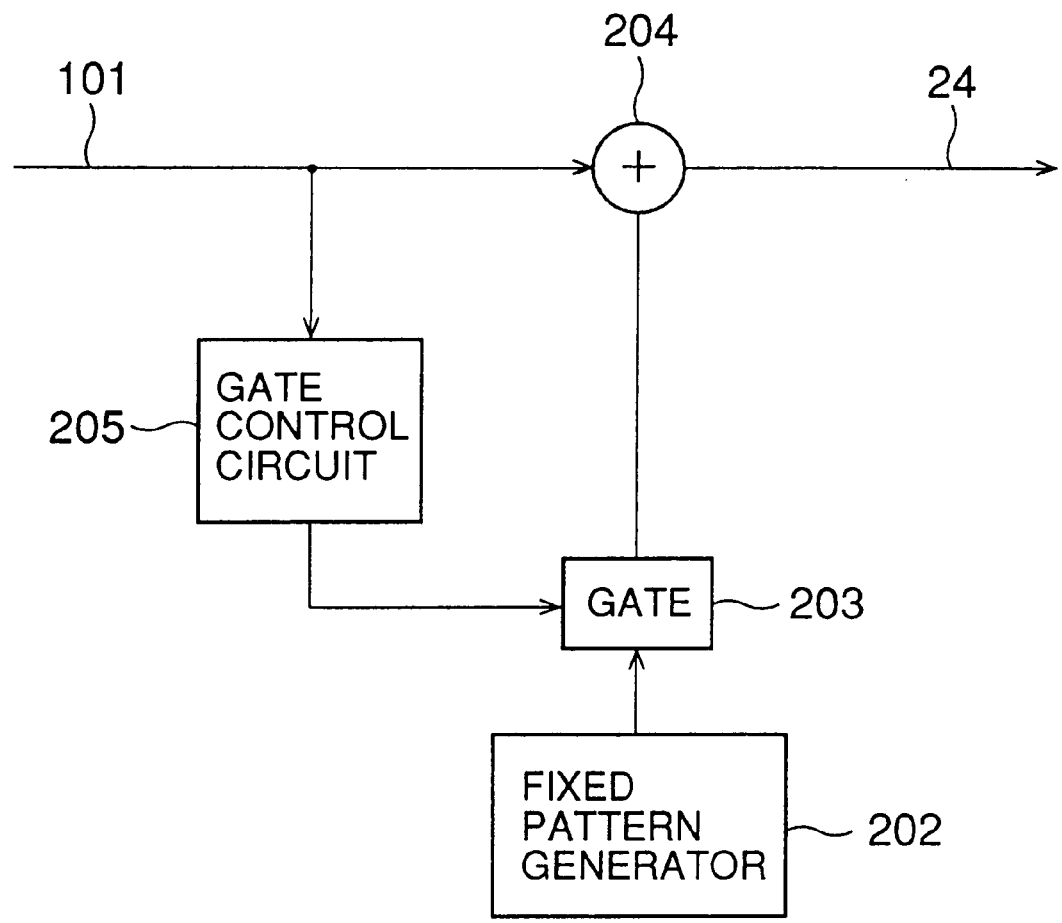
FIG. 8 is the configuration of the idle cell insertion circuit of FIG. 7.

FIG. 8 shows an example of configuration of the idle cell insertion circuit 22. In the figure, the ATM transmission signal 101 is input into a gate control circuit 205 to detect timing when the ATM cell is empty. A fixed pattern generator 202 outputs data in a fixed pattern being transmitted as the idle cells. The data in fixed pattern is fixed data of 53 bytes for all data in the header and payload sections.

The output of the fixed pattern generator 202 controls a gate circuit 203 with the output of the gate control circuit 205 to input the empty time interval in the cell idle cells which is then input into an adder 204. Transmission data inserted with the idle cells appears on the output of the adder 204.

Figure 9:
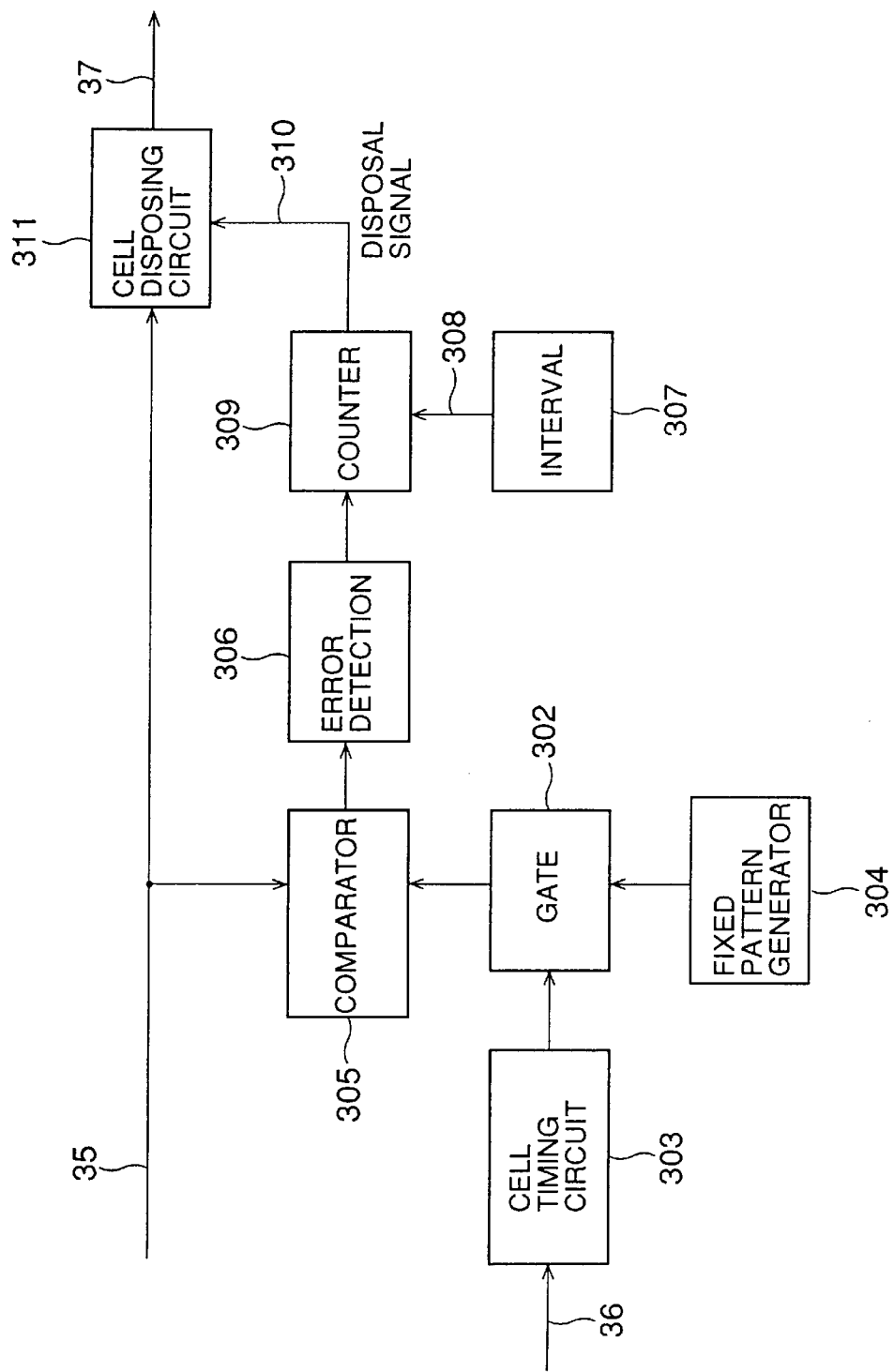
FIG. 9 is the configuration of the idle cell detector circuit 32 and the idle cell separator circuit 34 of FIG. 7.

FIG. 9 is a block diagram showing the configuration of the idle cell detector circuit 32 and the idle cell separator circuit 34 of FIG. 7.

In the figure, a frame synchronizing signal 36 detected by the modulator in the radio receiver circuit 33 is input into a cell timing circuit 303 so that the timing of the cell inserted at the transmitter side can be detected. In addition, a fixed pattern generator 304 is a pattern generator which generates the same data as the fixed pattern data from the fixed pattern generator 202 of FIG. 8. The output of the cell timing circuit 303 is input into the gate circuit 302 to perform control so that the output signal of the fixed pattern generator 304 is input into a comparator 305 at the cell insertion timing.

The comparator 305 compares bits of data in the demodulated data signal 35 and the output signal from the gate circuit 302. The output of the comparator 305 is input into an error detector circuit 306 which detects matching or unmatching of data, and inputs bit error into a counter 309.

The counter 309 receives an error from the error detector circuit 306 as its input, and counts it. Here, since the output 308 of an interval generator 307 for generating timing for each bit of one cell is input into the counter 309, the counter 309 counts the total number of errors for every cell. Then, when the count value is a predetermined count value set for the counter 309 or less, the counter outputs a disposing signal 310 to a cell disposing circuit 311.

In addition, when the count value exceeds the predetermined count value, the disposing signal 310 in not output.

With the above operation, a cell data array to be transmitted would be output to the output 37 of the cell disposing circuit 311.

The above-mentioned method for separating the idle cells has the following advantage.

Figure 1:
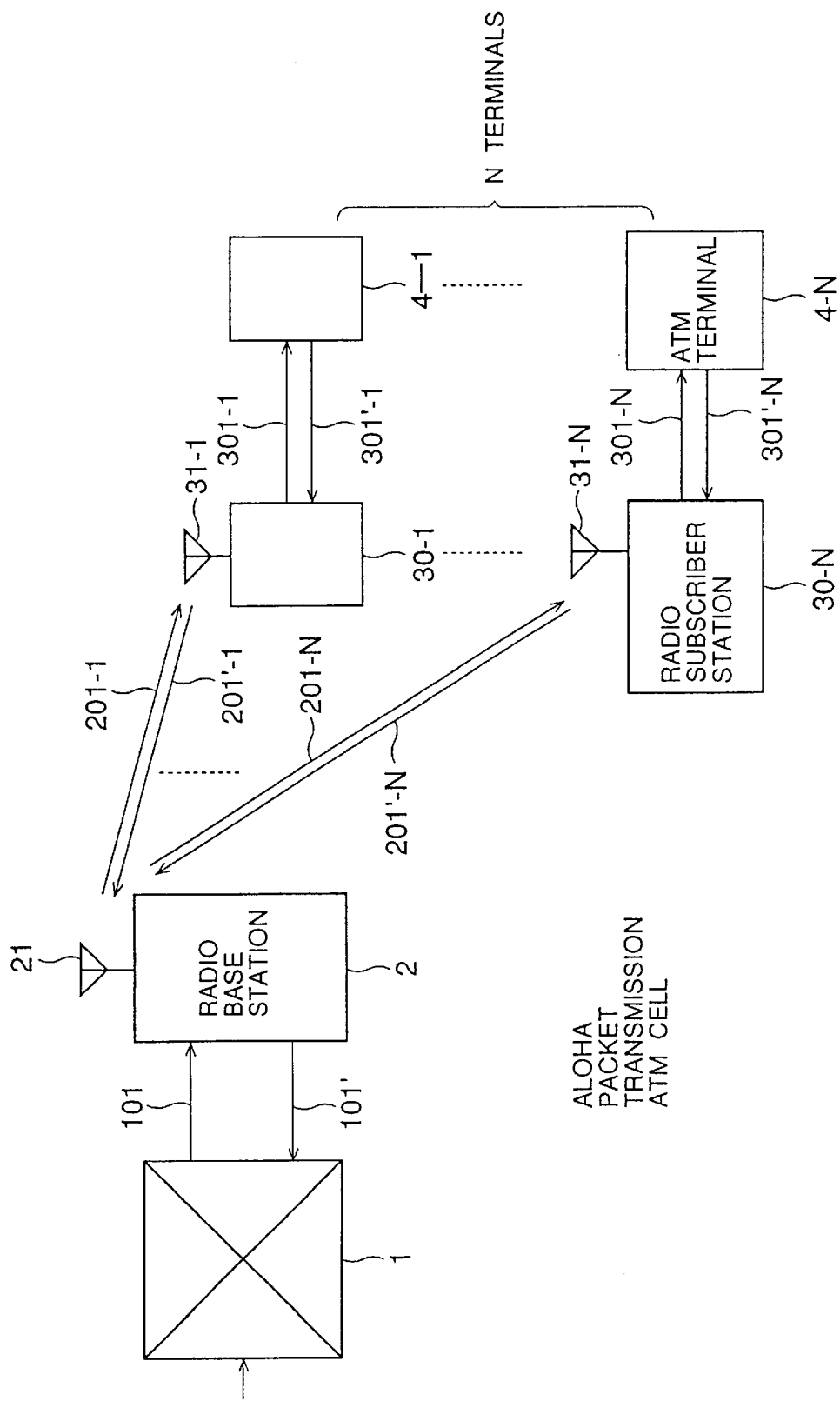
FIG. 1 is a network configuration of ATM digital radio transmission system in the conventional packet transmission.
Figure 2:
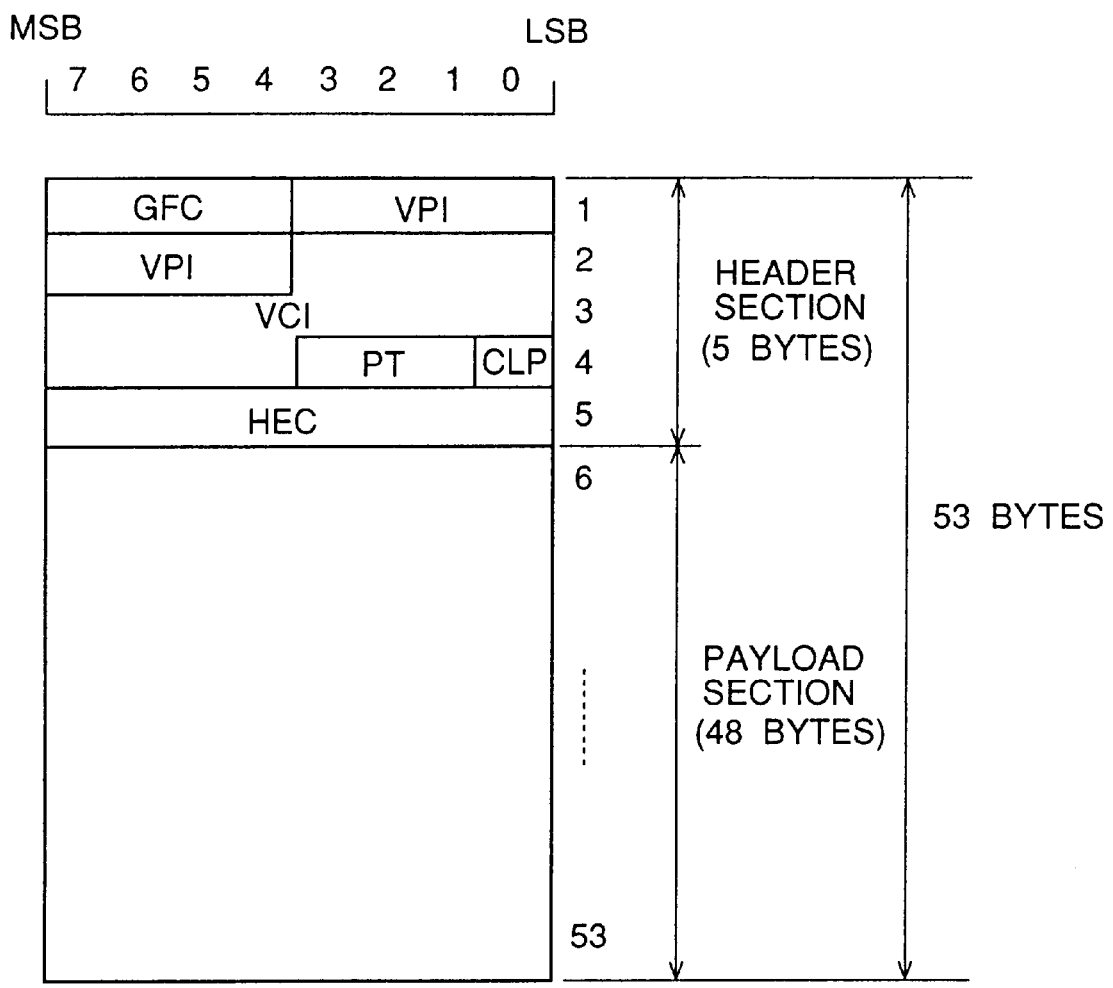
FIG. 2 is the configuration of an ATM cell.

The ATM cell used for the ATM transmission line is formed on the basis of HEC in the ATM header section as described in conjunction with FIG. 2. For a transmission line with little error such as an optical transmission line, there is no problem with error detection using CRC in the header section.

However, the radio transmission line is characterized in that transmission quality is significantly deteriorated because phenomena such as multi-path fading or reduction of receiving electric field by obstacles frequently occur. Thus, if HEC in the header section used on the ATM transmission line is used for detecting error in the idle cells on the radio transmission line as it is, there is a problem that correct error detection cannot be performed, and the idle cells containing error is sent out the ATM transmission line following the radio transmission line.

As countermeasures, there is a method performing powerful error correction by inserting an FEC (Forward Error Correction) bit in an idle cell. However, it has problems that a transmission bit length is increased, and that error correction becomes complicated.

The present invention provides an error detection system which solves the above problems, is highly reliable, and does not require increase of transmission bit.

As described above, the ATM digital radio transmission system and an apparatus for it use the TDMA/TDD system for radio transmitting the ATM cells so that throughput of the entire network can be enhanced.

In addition, the radio transmitter appends radio circuit error correction bits to an ATM cell data array to be transmitted, converts the array into radio ATM cells best suitable for transmission over the radio circuit, and transmits them, thereby enabling it to transmit high speed data in TDMA/TDD. That is, the present invention enables it to perform data transmission at as high speed as 25 Mbps–150 Mbps which is impossible in the conventional packet transmission.

In addition, since the present invention employs an approach to insert idle cells to the radio transmission speed, and to separate the idle cells at the receiver side, advantages can be attained that it becomes easy to detect interference waves, and to perform timing control for TDMA/TDD.

Furthermore, as for insertion and separation of the idle cells, a predetermined idle cell pattern is inserted into the header and information bit sections of the idle cell at the transmitter side, and the idle cell is digitally detected and separated at the receiver side. Consequently, it becomes possible to perform highly reliable ATM digital radio transmission by reducing probability of erroneous distribution of idle cells.

What is claimed is:

1. An ATM digital radio communication method in which an ATM cell data input and output in and from an ATM switch or an ATM terminal is bi-directionally transmitted between one radio base station and a plurality of radio subscriber stations over a high frequency radio circuit, said ATM digital radio communication method comprising the steps of:

inserting and sending an idle cell in a TDMA frame format into a part of said ATM cell data at a transmitter side of said radio base station or said plurality of radio subscriber stations, a predetermined fixed pattern being inserted into a header section and an information bit section of said idle cell;

performing the bi-directional transmission over said high frequency radio circuit in a TDMA/TDD system;

converting said ATM cell into a radio ATM cell containing a control bit and an error control bit in its header;

inserting said radio ATM cell into a burst signal for said TDMA/TDD system;

receiving a signal inserted with said idle cell at the receiver side of said radio base station or said plurality of radio subscriber stations;

comparing bits of said received idle cell with said fixed pattern previously stored; and separating said idle cell when a count value of errors is a predetermined number or less.

2. The ATM radio communication method as set forth in claim 1, wherein said radio ATM cell is arranged to have 5 bytes in a header section, and 48 bytes in a payload section, said header section being arranged to have said control bit in a first byte, a radio virtual channel identifier in a further two bytes, and the error control bit in yet a further two bytes.

3. The ATM radio communication method as set forth in claim 1, wherein said idle cell is inserted into said TDMA frame format when transmission capacity of said ATM cell data varies, and the number of cells to be transmitted in a unit of time varies.

4. The ATM radio communication method as set forth in claim 1, wherein said error control bit is a CRC error control bit.

5. An ATM digital radio communication system in which an ATM cell data input and output in and from an ATM switch or an ATM terminal is bi-directionally transmitted between one radio base station and a plurality of radio subscriber stations over a high frequency radio circuit, said ATM digital radio communication system performing the bi-directional transmission over the high frequency radio circuit in a TDMA/TDD system;

each of said radio base station and said plurality of subscriber stations comprising:

an idle insertion circuit for inserting and sending an idle cell in a TDMA frame format into a part of said ATM cell data at the transmitter side of said radio base station or said plurality of radio subscriber stations, a predetermined fixed pattern being inserted into a header section and an information bit section of said idle cell;

an idle cell detector circuit for receiving a signal inserted with said idle cell at the receiver side of said radio base station or said plurality of radio subscriber stations, and comparing bits of said received idle cell with a fixed pattern previously stored to determine whether or not a count value of errors is a predetermined number or less; and an idle cell separator circuit for separating said idle cell when said count value of errors is said predetermined number or less;

an ATM transmission interface circuit for converting said ATM cell into a radio ATM cell containing a control bit and an error control bit in its header;

a radio transmission circuit for transmitting said radio ATM cell as a TDMA burst signal;

a radio receiving circuit for receiving the output of said radio transmission circuit and modulating said radio ATM cell; and an ATM receiving interface circuit for converting said radio ATM cell into said ATM cell.

6. The ATM radio communication system as set forth in claim 5, wherein said radio ATM cell is arranged to have 5 bytes in a header section, and 48 bytes in a payload section, said header section being arranged to have said control bit in a first byte, a radio virtual channel identifier in a further two bytes, and the error control bit in yet a further two bytes.

7. The ATM radio communication system as set forth in claim 5, wherein said idle cell is inserted into said TDMA frame format when transmission capacity of said ATM cell data varies, and the number of cells to be transmitted in a unit of time varies.

8. The ATM radio communication system as set forth in claim 5, wherein said error control bit is a CRC error control bit.

* * * * *